US008836529B2

(12) United States Patent
Thomsen (10) Patent No.: US 8,836,529 B2
(45) Date of Patent: Sep. 16, 2014

(54) CHAIN SAW HAZARD WARNING LIGHT (76) Inventor: Kenneth J. Thomsen, Olympia, WA (US)

(\*) Notice: Subject to any disclaimer, the term of this patent is extended or adjusted under 35 U.S.C. 154(b) by 492 days.

(21) Appl. No.: 13/374,969

(22) Filed: Jan. 25, 2012

(65) Prior Publication Data

US 2012/0188089 A1   Jul. 26, 2012

Related U.S. Application Data

(60) Provisional application No. 61/461,991, filed on Jan. 26, 2011.

(51) Int. Cl.
*G08B 21/00* (2006.01)
*F16P 3/14* (2006.01)
*B27G 19/00* (2006.01)

(52) U.S. Cl.
CPC .............. *F16P 3/144* (2013.01); *B27G 19/003* (2013.01)
USPC ..................... 340/686.3; 340/686.2; 362/119; 362/197; 30/379; 30/379.5; 30/381; 30/382; 30/383; 144/335; 144/420; 33/1 DD; 33/348

(58) Field of Classification Search
CPC .......... G08B 21/00; B25B 23/18; B27B 5/10; B27B 17/083; B27B 17/02; A01G 3/04; A01G 23/08; G01C 9/32
USPC ................... 340/686.3, 686.2; 362/119, 197; 30/379, 379.5, 381, 382, 383; 144/335, 144/420; 33/1 DD, 348
See application file for complete search history.

(56) References Cited

U.S. PATENT DOCUMENTS

| | | | | |
|---|---|---|---|---|
| 2,525,588 A | * | 10/1950 | Cameron et al. | 362/119 |
| 3,389,728 A | * | 6/1968 | Galis | 144/34.1 |
| 4,283,757 A | * | 8/1981 | Nalbandian et al. | 362/120 |
| 4,300,736 A | * | 11/1981 | Miles | 244/3.13 |
| 4,315,370 A | | 2/1982 | Horne | |

(Continued)

FOREIGN PATENT DOCUMENTS

| | | | | |
|---|---|---|---|---|
| JP | 2008065720 A | * | 3/2008 | |
| JP | 2008188188 | * | 8/2008 | |

OTHER PUBLICATIONS

BC Forest Safety Council: "Chainshot—Safety Alert of the Month—Jan. 2011", comprising 3 pages, available on Internet at http://www.bcforestsafe.org/AOM_January2011 (U.S.A.).

(Continued)

*Primary Examiner* — Benjamin C Lee
*Assistant Examiner* — Quang D Pham
(74) *Attorney, Agent, or Firm* — Brian J. Coyne (57) ABSTRACT

A chain saw hazard warning light and method for using same. A pair of oppositely-directed light sources emit light beams throughout a chain shot hazard warning zone through rectilinear, slotted openings at opposite ends of a housing. The light beams turn on, if and only if, the cutting chain is rotating about the chain guide bar; alternatively, initiation of rotation of the cutting chain is delayed to permit the light beams to turn on some time prior thereto. The zone is defined by first and second pairs of planes that diverge in opposite directions from the chain guide bar, said planes being disposed at equal, acute angles (most preferably 15°) to, and on opposite sides of, a plane that includes the chain guide bar.

20 Claims, 9 Drawing Sheets

(56) References Cited

U.S. PATENT DOCUMENTS

| | | | |
|---|---|---|---|
| 4,805,308 A | 2/1989 | Ritola | |
| 4,813,142 A * | 3/1989 | Manno | 30/379.5 |
| 4,829,579 A * | 5/1989 | Harada et al. | 704/270 |
| 4,833,782 A * | 5/1989 | Smith | 30/392 |
| 5,101,567 A | 4/1992 | Cool | |
| 5,201,350 A * | 4/1993 | Milbourn | 144/24.13 |
| 5,727,610 A * | 3/1998 | Isley | 144/4.1 |
| 5,746,261 A * | 5/1998 | Bowling | 144/24.12 |
| 6,186,638 B1 * | 2/2001 | Chang | 362/119 |
| 6,408,906 B1 * | 6/2002 | Moon et al. | 144/24.13 |
| 6,587,043 B1 | 7/2003 | Kramer | |
| 6,718,661 B1 * | 4/2004 | Miller | 37/403 |
| 6,939,022 B2 * | 9/2005 | Brooks | 362/120 |
| 7,677,279 B2 | 3/2010 | Swinyard et al. | |
| 7,690,407 B2 * | 4/2010 | Annala | 144/4.1 |
| 7,882,864 B2 * | 2/2011 | Fargeot | 144/4.1 |
| 8,430,621 B2 * | 4/2013 | Jantti | 414/699 |
| 2002/0053270 A1 * | 5/2002 | King | 83/13 |
| 2002/0054491 A1 * | 5/2002 | Casas | 362/119 |
| 2004/0125596 A1 * | 7/2004 | Brooks | 362/119 |
| 2005/0188551 A1 * | 9/2005 | Magnuson et al. | 30/382 |
| 2005/0199316 A1 * | 9/2005 | Ong | 144/335 |
| 2007/0102591 A1 | 5/2007 | Toth | |
| 2008/0196790 A1 * | 8/2008 | Fargeot | 144/4.1 |
| 2014/0096870 A1 * | 4/2014 | Kaye et al. | 144/335 |
| 2014/0096871 A1 * | 4/2014 | Kaye | 144/335 |

OTHER PUBLICATIONS

Blount Europe SA/NV: "Harvester Chain Shot;" available on Internet at http://www.oregonchain.eu/en/support/safety-tips/harvestharvester-chain-shot.html?id=196; Published worldwide; comprising 2 pages.

Washington State Department of Labor & Industries: "'Chain Shot' Can Kill!"; comprising 2 pages; available on Internet at http://www.lni.wa.gov/Safety/Basics/HazAlerts/PDFs/chainshot.pdf Published worldwide.

* cited by examiner

CHAIN SAW HAZARD WARNING LIGHT

CROSS-REFERENCE TO RELATED PATENT APPLICATIONS

This application claims the benefit of U.S. provisional application No. 61/461,991 for the same invention, filed on Jan. 26, 2011, the disclosure of which is incorporated herein.

STATEMENT REGARDING FEDERALLY APPROVED RESEARCH OR DEVELOPMENT

None.

BACKGROUND OF THE INVENTION

1. Field of the Invention

This invention relates generally to power chain saws and, more particularly, to safety devices as may be applied to alerting persons in the vicinity of a chain saw that they are in a zone of danger for potential injury from flying chain fragments in the event of a break in a cutting chain. More specifically, the present invention pertains to a chain saw hazard warning light, and a method for using the same, to warn personnel away from a zone of danger during operation of the chain saw portion of a forest harvester.

2. Background Art

Power chain saw operators and nearby personnel have incurred bodily injury and even death when hit by flying fragments of a broken cutting chain. This phenomenon, sometimes referred to as "chain shot," can happen both on a manual chain saw as well as on a forest harvester equipped with a chain saw. Causes for breakage include improper chain tension, maintenance or repair, a damaged chain drive sprocket, chain guide bar and/or cutting chain, improper chain guide bar and chain lubrication, or excessive chain speed. Since a cutting chain can travel as much as 15,000 revolutions per minute around a chain guide bar, broken chain fragments will virtually always fly off at high velocity close to or within a plane that includes the chain guide bar. The direction of movement of chain fragments can be either in the direction that the chain guide bar is pointing at the time of chain breakage or in the opposite direction. In the case of a forest harvester, there is a direct hazard to the operator in the harvester cab when the chain guide bar is pointing toward the cab because chain shot has been known to penetrate the cab window under those circumstances and strike the operator within the cab.

One approach to reducing the hazard presented by a broken cutting chain has been to impose restrictions on the movement of broken chain ends and chain fragments. For a hand-held chain saw, U.S. Pat. No. 7,690,407 B2 issued to Annala disclosed a protective wall positioned in the vicinity of the chain drive gear that was capable of receiving the movement of the tail of the broken cutting chain and guiding the broken chain in a desired direction. U.S. Pat. No. 5,101,567 issued to Cool disclosed a safety switch that deenergized the chain drive of a hand-held chain saw in the event of a break in the cutting chain, and also disclosed a chain braking mechanism and safety guard to effect stoppage of the cutting chain motion. U.S. Pat. No. 4,805,308 issued to Ritola disclosed a roller attachment to the handle of a hand-held chain saw. The roller was aligned with the chain guide bar so as to extend substantially perpendicularly through the plane defined by the chain guide bar in order to intercept the saw chain should it become derailed. U.S. Pat. No. 4,315,370 issued to Horne disclosed a finger piece that acted as a safety surface in the event of breakage of the cutting chain on a hand-held chain saw. The finger piece was located far enough forward from the chain drive to force the whipping length of the chain to pivot and catch the broken chain.

The present invention, however, takes a different approach to the chain shot problem—namely, provision of a hazard warning light, preferably a flashing strobe light, illuminating just the chain shot danger zone to warn personnel away from that zone during operation of a chain saw. In other contexts, flashing lights and focused warning sounds have been used to warn of safety hazards. U.S. Pat. No. 6,587,043 B1 issued to Kramer disclosed a driver warning system that detected vehicle handling conditions and produced warnings in the form of arrays of flashing lights and/or a warning buzzer directed to the vehicle driver only, the intensity of which warnings was correlated to the seriousness of the safety hazards detected by the system. Patent Application No. US 2007/0102591 A1 of Toth disclosed a warning system for intersections, particularly railway crossings, that could identify when a train or vehicle was approaching an intersection and emit a sound warning beam that was focused into a danger zone. The approach taken by Kramer, i.e., by analogous reasoning, directing a hazard warning to the operator of a chain saw only, would be inadequate because nearby personnel who may be endangered by chain shot would not receive the warning. The approach taken by Toth, i.e., by analogous reasoning, focusing and projecting a sound warning into a chain shot zone of danger, would also be inadequate because the loud noise generated by the chain saw itself would tend to drown out the sound warning such that nearby personnel would likely not hear it.

SUMMARY OF THE INVENTION

Thus, there remains a need for a chain saw hazard warning light that projects a warning light into a chain shot danger zone whenever the cutting chain of a power chain saw is rotating around the chain guide bar thereof. The term "chain saw" is here defined to include an electrically-powered, hand-held power chain saw as well as any power chain saw that is attached to, suspended from, or incorporated into a dangle head carried by an articulated boom of a forest harvester carrier. The danger zone certainly must include the plane that includes the chain guide bar portion of the chain saw, but, to adequately protect nearby personnel, the danger zone needs to be somewhat wider than that. Thus, the danger zone is defined by first and second pairs of planes that diverge in opposite directions away from the chain guide bar, said planes being disposed at equal, acute angles to, and on opposite sides of, the plane that includes the chain guide bar. The acute angles formed at the intersections of those pairs of planes with a plane that includes the chain guide bar are preferably in the range 10 to 20 degrees, and most preferably 15 degrees.

Accordingly, it is an object of the present invention to provide a first beam of light that is projected into a chain shot danger zone in a first direction and a second beam of light that is projected into said chain shot danger zone in a second, opposite direction, if and only if, the cutting chain is rotating about the chain guide bar.

In order to limit the first and second beams of light to illuminate the chain shot danger zone only, it is a further object of the invention to provide a housing that extends from a first end wall to a second, opposite end wall, said first and second end wall each having a slotted opening to permit passage of said first and second light beams therethrough, together with a first electric light source means mounted within said housing adjacent to, and distance d from, said first slotted opening and facing said first direction, and a second electric light source means mounted within said housing adjacent to, and distance d from, said second slotted opening and facing said second direction, wherein each said slotted opening is rectilinear and is defined by a first parallel pair of sides having height H joined by a second parallel pair of sides having width W, and wherein said first pair of sides is parallel to said plane that includes said chain guide bar.

In a preferred embodiment of the invention, it is a still further object that H is greater than W, and W and d are each chosen such that arctangent (W/2d) is preferably is in the range to Π/18 to Π/9 radians, corresponding to 10 to 20 angular degrees.

According to one aspect of the invention, it is another object of the invention to employ a linear array of light emitting diode strobe lights for each of said first and second electric light sources, aligned parallel to said first sides of said first and second slotted openings, respectively.

According to another aspect of the invention, for a chain saw that is mounted within an interior portion of a chain box for pivotal movement of the chain guide bar thereof between a retracted position within said chain box and an extended, cutting position outside said chain box, wherein said chain box is pivotally attached to an articulated boom that is carried by a forest harvester carrier, said chain box having a pair of side walls joined by a rear wall and said chain box having an open front to permit pivoting of said chain saw to a cutting position, hereinafter referred to as a harvester-mounted chain saw, it is another object of the invention to attach said housing to said interior portion of said chain box such that said first end of said housing faces toward said first direction and said second end faces said rear wall of said chain box; and said rear wall has a slotted opening in registry with said second slotted opening and is dimensioned to permit passage of said second light beam therethrough.

It is another object of the invention to provide a wire tap for such a harvester-mounted chain saw, wherein said harvester-mounted chain saw includes a hydraulic motor for rotating said cutting chain around said chain guide bar, and said forest harvester carrier includes an electric battery and chain saw switch means wired to said battery for activating and deactivating said hydraulic motor, wherein said wire tap conducts electric current from said switch means to said first and second light sources if, and only if, said switch means is closed and said cutting chain is revolving about said chain guide bar.

To achieve these objects of the invention, there is provided means for emitting a first light beam in a first direction within a chain shot warning zone; means for emitting a second light beam in a second, opposite direction within said warning zone; and means for energizing said first and second means for emitting a light beam to cause said means to emit light if, and only if, said cutting chain is rotating about said chain guide bar; wherein said warning zone is defined by first and second pairs of planes that diverge in opposite directions from said chain guide bar, said planes being disposed at equal, acute angles to, and on opposite sides of, a plane that includes said chain guide bar.

In a preferred embodiment of the invention, said means for emitting said first and second light beams includes a housing that extends from a first end wall to a second, opposite, end wall, said first and second end walls each having a slotted opening to permit passage of said first and second lights beams therethrough, respectively; a first electric light source means mounted within said housing adjacent to said first slotted opening and facing said first direction; and a second electric light source means mounted within said housing adjacent to said second slotted opening and facing said second direction.

Preferably, each said slotted opening is rectilinear and is defined by a first, parallel pair of sides having height H joined by a second parallel pair of sides having width W; said first pair of sides is parallel to said plane that includes said chain guide bar, H is greater than W, and arctangent (W/2d) is in the range to Π/18 to Π/9 radians, corresponding to 10 to 20 angular degrees.

Advantageously, said first and second light sources each include four light emitting diode strobe lights aligned parallel to said first sides of said first and second slotted openings, respectively.

In the case of a harvester-mounted chain saw that is mounted within an interior portion of a chain box for pivotal movement of its chain guide bar between a retracted position within the chain box and an extended, cutting position outside of the chain box, wherein the chain box has a pair of side walls joined by a rear wall, and the chain box has an open front to permit rotation of the chain saw to a cutting position, the housing of the chain saw hazard warning light is preferably attached to the interior portion of the chain box such that the first end wall of the housing faces toward the first direction and the second end wall of the housing faces toward the rear wall of the chain box; and the rear wall of the chain box has a slotted opening in registry with the second slotted opening of the second end wall of the housing and dimensioned to permit passage of said second light beam therethrough to illumine the entire chain shot danger zone. As is typically the case, such a harvester-mounted chain saw includes a hydraulic motor for rotating said cutting chain around the chain guide bar; the carrier includes an electric battery and chain saw switch means wired to the battery for activating and deactivating the hydraulic motor; and the means for energizing the first and second means for emitting a light beam to cause said means to emit light if, and only if, the cutting chain is in rotating about the chain guide bar includes a wire tap that connects the switch means to the first and second light sources and conducts electric current thereto if, and only if, the switch means is closed and the cutting chain is rotating around the chain guide bar.

For use with a chain saw having a cutting chain mounted for rotation about a chain guide bar and with switch means operably connected to the chain saw for starting and stopping said rotation by energizing and deenergizing the chain drive thereof, respectively, there is further provided a method for projecting a warning light throughout a chain shot hazard warning zone if and only if, said rotation is, or will be within T seconds, occurring. The method comprises the steps of attaching to a chain saw or to a device to which the chain saw is attached, incorporated into, or suspended from, a chain saw hazard warning light, wherein the chain saw hazard warning light includes a housing that extends from a first end wall to an opposite second end wall, the first and second end walls each having first and second, rectilinear, slotted openings, respectively, said openings each having height H and width W. The chain saw warning light further includes a first electrical light source mounted within the housing a distance d from said rectilinear, slotted opening of said the first end wall and disposed for projecting a first light beam through said first slotted opening in a first direction throughout, and limited to, the warning zone, said first electric light source having a first pair of electrical wire leads; a second electric light source mounted within said housing a distance d from said rectilinear, slotted opening of the second end wall, and disposed for projecting a second light beam through said second slotted opening in a second, opposite direction throughout, and limited to, the warning zone, said second electric light source having a second pair of electrical wire leads. Further included within the chain saw hazard warning light are a first wire tap attached to a first wire lead of each said pairs of wire leads, and a second wire tap attached to said second wire leads of each of said second pairs of wire leads. The method further includes the step of wiring said first and second wire taps to the switch means. The warning zone is defined by first and second pairs of planes that diverge in opposite directions from said chain guide bar, said planes being disposed at equal, acute angles to, and on opposite sides of, a plane that includes said chain guide bar. Whenever necessary to achieve illumination throughout the entire chain shot hazard warning zone, the method further comprises the step of creating a slotted opening in any portion of said chain saw or in said device that interferes with the projection of light from said first and/or second lights sources into said zone Z in order to permit light to project from said sources throughout said zone whenever said rotation is occurring or will be occurring within T seconds. This is accomplished by interposing time delay means between the switch means and the chain drive of the chain saw so that closing the switch means turns on the hazard warning light before the cutting chain commences rotation about the chain guide bar. Optionally, the method further includes wiring electro-acoustic means into the switch means circuit to provide a sound alert to accompany the warning light.

Thus, the instant invention provides these and other features and advantages that will become apparent from the detailed description and drawings set forth below.

DETAILED DESCRIPTION OF THE INVENTION

Figure 1:
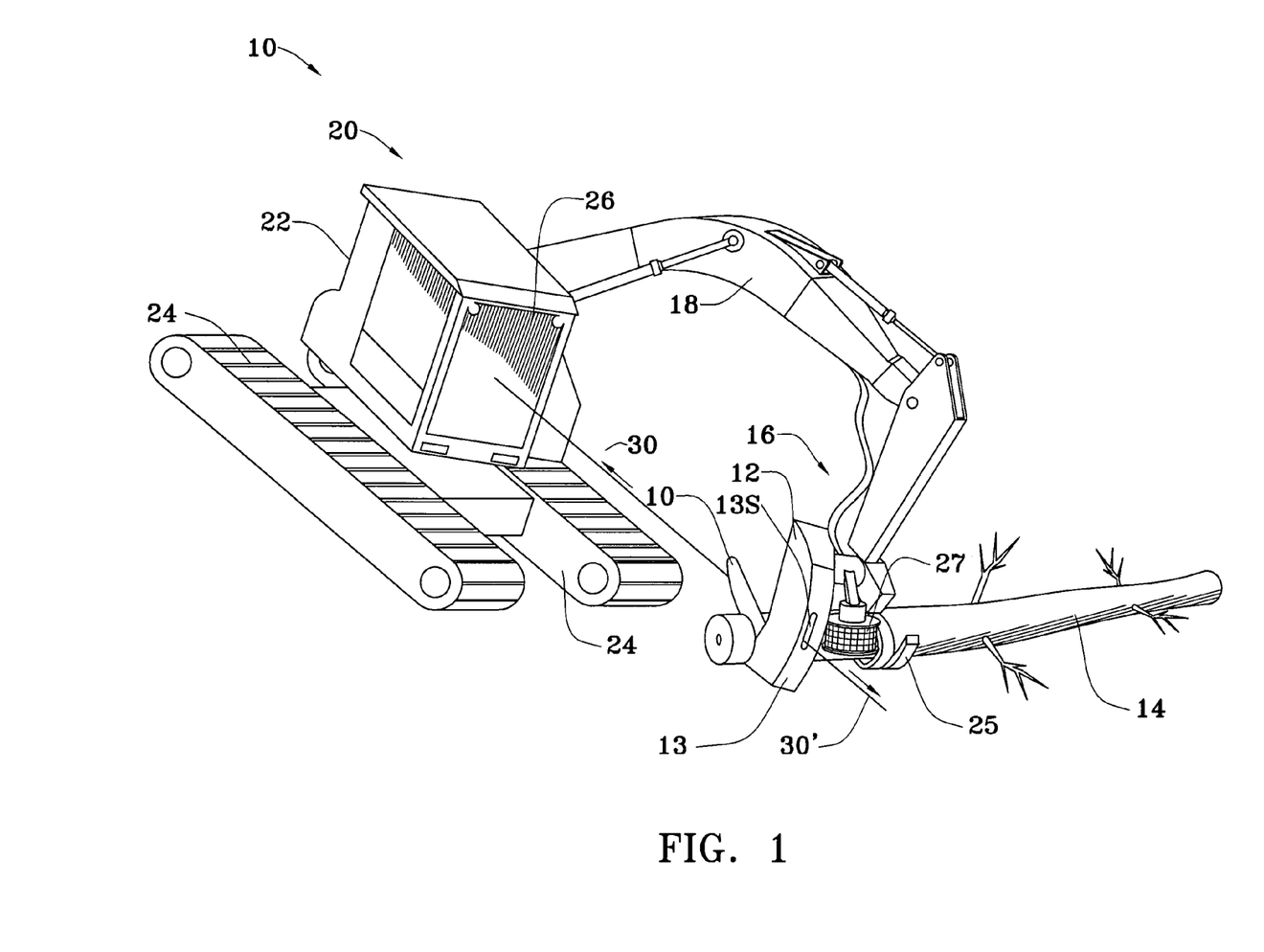
FIG. 1 is a perspective view of a felled tree being cross cut by a chain saw housed within a chain box attached to a dangle head processor of a forest harvester, which chain box that has been equipped with the hazard warning light of the present invention.

Referring now to FIG. 1, a chain saw 10 is depicted as pivotally extended out of a chain box 12 and in the act of cross cutting a felled tree 14 that is encompassed by a pair of delimbing knives 25 and grasped between a pair of feed rollers 27. The chain box 12 is incorporated into a dangle head processor 16 attached to an articulated boom 18 carried by a forest harvester carrier 20. The forest harvester carrier 20 includes a cab 22 mounted over a parallel pair of treads 24, as well as a hydraulic system (not shown) for actuating and controlling the treads 24, cab 22, boom 18, dangle head processor 16 and chain saw 10. A straight line 30 that extends from the chain saw 10 to the front window 26 of the cab 22 indicates a first light beam being generated in a first direction by the chain saw hazard warning light 100 of the present invention, which hazard warning light is installed within a hollow interior space 15 of the chain box 12, as may be seen more clearly in FIG. 3. A second straight line 30' extends through a slotted opening 13S in a rear wall 13 of the chain box 12 in a second, opposite direction away from the chain saw 10 and chain box 12, and depicts a second light beam generated by the hazard warning light 100. The straight lines 30, 30' lie in a plane B-B that includes the chain guide bar 10B of the chain saw 10; see FIG. 6. Thus, FIG. 1 depicts a hazardous condition for the operator (not shown) within the cab 22 of the forest harvester carrier 20 because, should the cutting chain 10C break, chain shot 40 in the form of cutting chain links and/or fragments of the cutting chain could travel along a path close or identical to line 30, penetrate the front window of the cab 22, and strike the operator. Accordingly, when the operator sees the warning light 100 shining into the cab 22, it is a visual warning to immediately move the dangle head processor 16 and/or interrupt the cutting action of the chain saw 10 to eliminate the danger. Alternatively, or in addition, in the event of a cutting chain break, chain shot 40 could travel in an opposite direction along, or close to, a path indicated by straight line 30' and potentially injure nearby personnel positioned within the line of fire.

Figure 2:
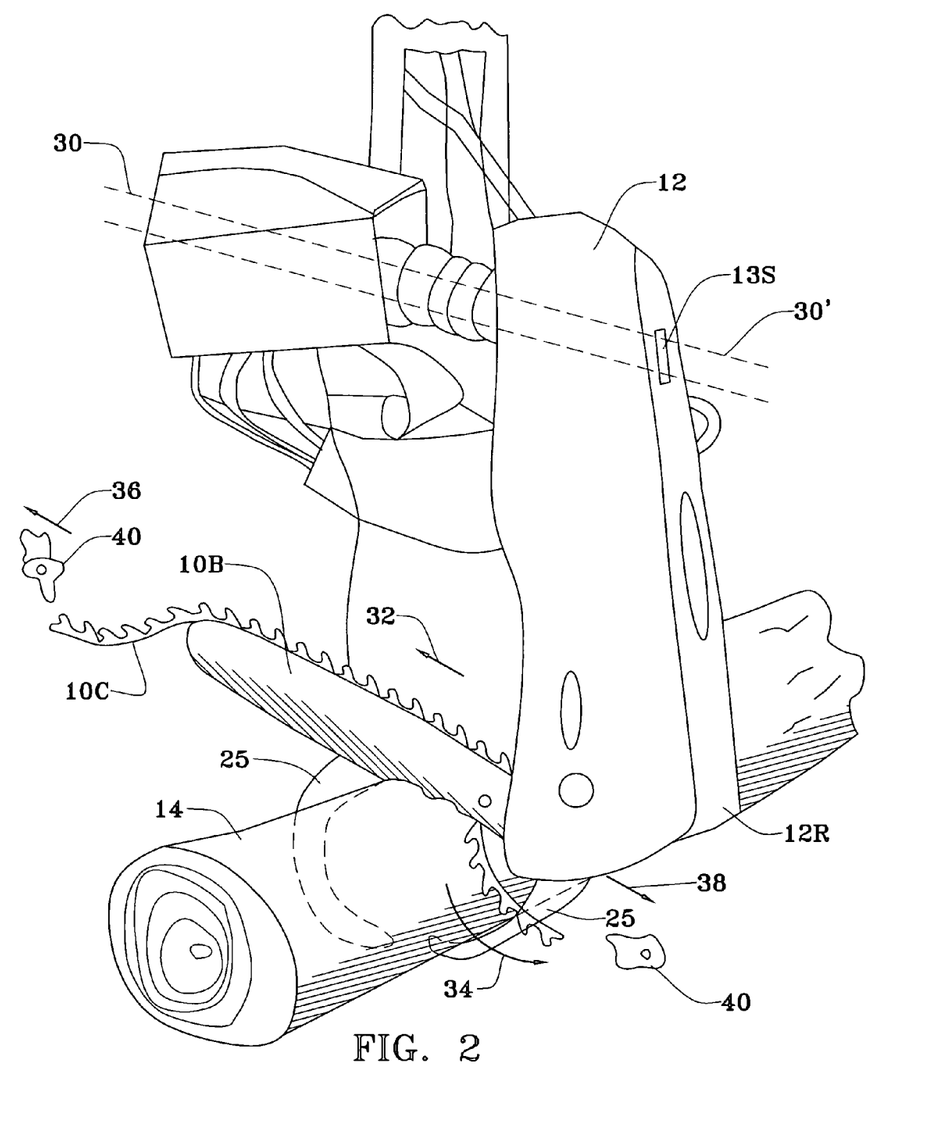
FIG. 2 is an enlarged, perspective view thereof, showing that the cutting chain has broken and chain fragments that have been launched in opposite directions within the plane of the chain guide bar, as indicated by arrows.

In FIG. 2, the cutting chain 10C is depicted as moving forward along a top margin of the chain guide bar 10B (arrow 32) and as having broken and separated below a lower margin of the chain guide bar, with a proximal end of the cutting chain whipping around the chain box (arrow 34). Chain shot 40 is depicted as flying away from the chain saw 10 in a first direction, indicated by arrow 36, and more chain shot is shown flying away from the chain saw in a second, opposite direction, indicated by arrow 38, said first and second directions 36, 38 lying within the plane B-B that includes the chain guide bar. Since the cutting chain drive 10D has not been deenergized yet, the hazard warning light beams 30, 30' continue to shine within the plane B-B that includes the chain guide bar.

Figure 3:
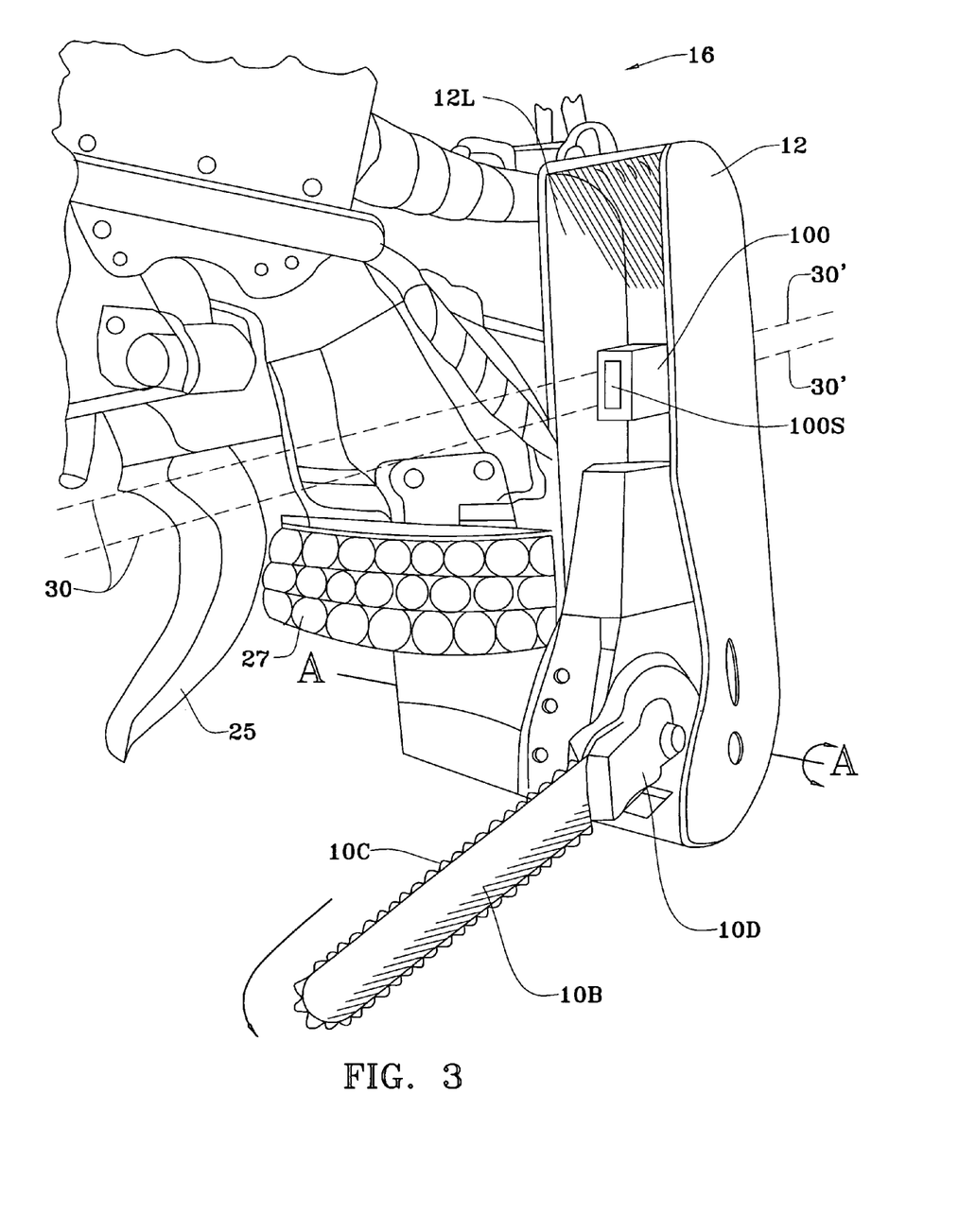
FIG. 3 is a further enlarged, perspective view thereof, showing the cutting chain still in motion about the chain guide bar, the felled tree removed, the chain saw pivoted about axis A-A to an extended, but lowered position, and the hazard warning light of the present invention attached to a side wall of the chain box above, and normal to, the axis A-A, and emitting a warning light as depicted by dashed lines.
Figure 4:
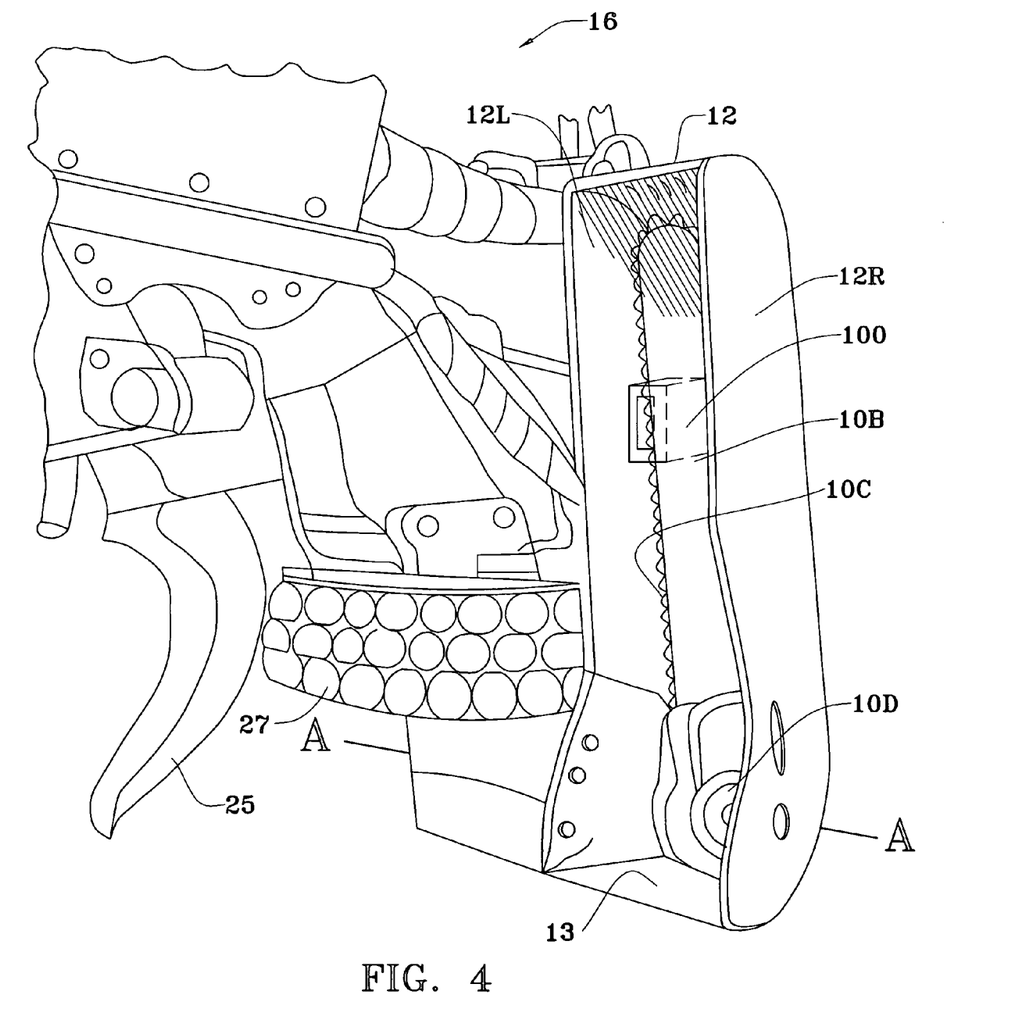
FIG. 4 is a reprise of FIG. 3, except that the chain saw is no longer in operation and has been pivoted about axis A-A up to a retracted position within the chain box, and, consequently, the hazard warning light is no longer emitting a warning light.
Figure 5:
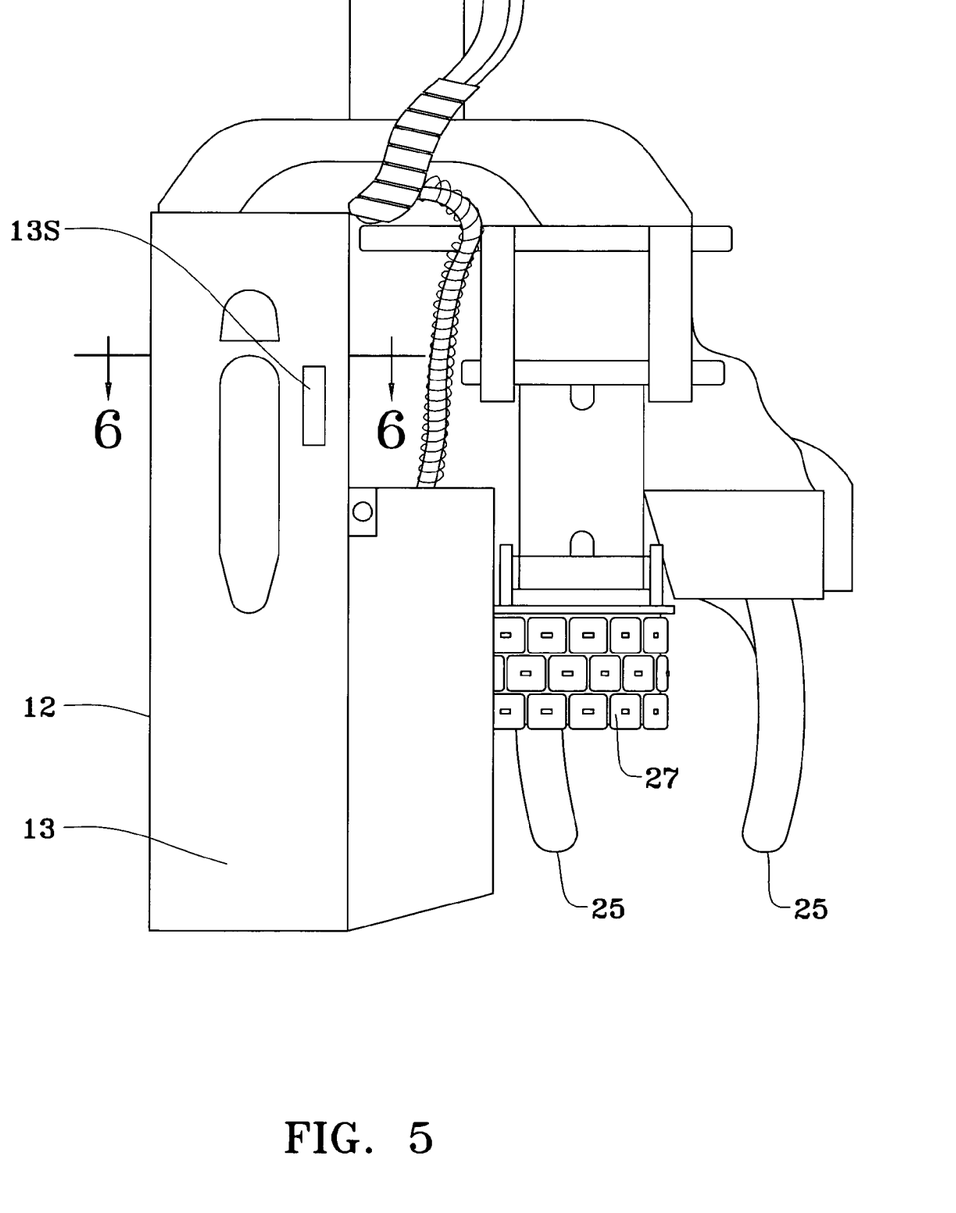
FIG. 5 is a front, elevational view of the dangle head processor of the forest harvester, showing a slotted opening in a front wall of the chain box thereof to permit transmission of a hazard warning light beam therethrough whenever the cutting chain is in motion about the chain guide bar.

In FIG. 3, the felled tree 14 has been removed for clarity, the chain guide bar 10B is still in an extended position, the cutting chain 10C is still revolving around the chain guide bar 10B, and the first and second hazard warning light beams 30, 30' are turned on. The hazard warning light 100 is here depicted as installed within a hollow, interior space of the chain box 12. In this particular embodiment of the invention, the positioning and attachment of the hazard warning light 100 to the interior of the chain box 12 is adjacent to an interior surface of a left wall 12L of the chain box, tucked away such that the chain saw can be pivoted, without interference from the hazard warning light, about axis A-A back to a retracted position within the chain box when it is not in use; see FIG. 4. A rear wall 13 joins the left wall 12L and right wall 12R of the chain box 12. A slotted opening 13S has been cut in the rear wall 13 of the chain box 12 to permit light to travel from the hazard warning light 100 through the rear wall in the second direction 30'. The chain box 12 is open at the front and thus presents no obstruction to transmission of light from the hazard warning light 100 in the first direction 30. It will be understood however, that the hazard warning light 100 need not be installed within the hollow interior space 15 of the chain box 12. It could be installed, for instance, to an exterior surface of the left wall 12L or of the right wall 12R of the chain box 12. Other possible installation locations on the dangle head processor 16 will be apparent to persons of ordinary skill, provided only that care is taken to locate the hazard warning light 100 within, or near to, the plane B-B of the chain guide bar 10B—preferably, within one meter of either side of said plane—and oriented so that, when energized, it will emit light beams in opposite directions 30, 30'.

Figure 6:
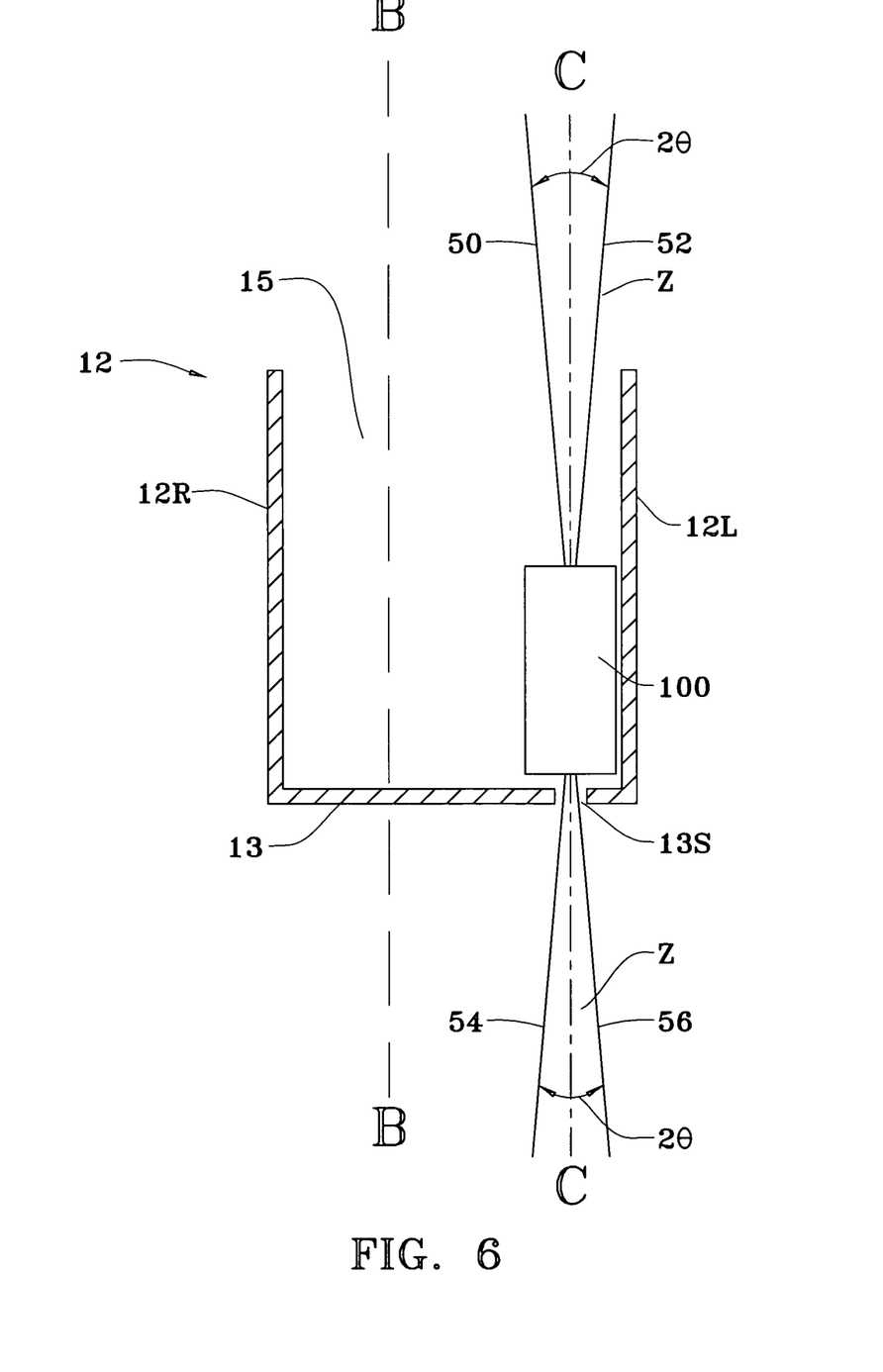
FIG. 6 is a further enlarged, horizontal, fragmentary, cross-sectional view of the chain box taken along line 6-6 of FIG. 5, with the chain drive mechanism, chain guide bar and cutting chain removed for clarity, showing that, while the warning light beams extend in opposite directions along a plane C-C that is parallel and adjacent to a plane B-B that includes the chain saw bar, each of the beams deviates angularly and laterally from the plane B-B and thereby defines the shot chain warning zone that is illuminated by the two light beams.

Referring now to FIG. 6, the hazard warning light 100 of the present invention is depicted installed within the hollow, interior space 15 of the chain box 12, adjacent to an interior surface of the left wall 12L thereof and adjacent to an interior surface of the rear wall 13 thereof. The axis B-B that includes the chain saw bar 10B (bar omitted for the sake of clarity) is depicted as parallel and nearby to a plane C-C that longitudinally bisects the hazard warning light 100. In the illustrated embodiment, plane B-B and plane C-C are so near to each other—e.g., less than 6 inches (16 cm) apart—that, for all practical purposes, they can be considered to be coplanar. In any event, the distance between plane B-B and plane C-C preferably should not exceed a man's stride or about one meter. Thus, for the purposes of the present invention, plane C-C is taken to be substantially coplanar with plane B-B and all references herein to the plane B-B are intended to refer equally to the plane C-C, and vice-versa. FIG. 6 illustrates, therefore, that a chain shot warning zone Z is defined by a first pair of planes 50, 52 that extend angularly away from the hazard warning light 100 in a generally first direction and a second pair of planes 54, 56 that extend angularly away from said light in a generally second, opposite direction, thereby defining a chain shot warning zone Z. The angular deviation δ of the planes 50, 52 from the plane B-B of the chain guide bar 10B (coplanar with plane C-C) is preferably 10 to 20 degrees, and most preferably 15 degrees on either side of plane B-B.

Although the warning zone Z as illustrated in FIG. 6 is depicted in two dimensions only, it is actually three-dimensional as it includes a third, perpendicular, height dimension that is left unspecified in FIG. 6. But, since the purpose of the present invention is to provide a visual hazard warning to a chain saw operator and to nearby personnel whenever a chain saw is operating, the extent of the warning zone along the height dimension that is illuminated by the hazard warning light includes the usual eye level of such persons with respect to the instantaneous position of the chain guide bar.

Figure 8:
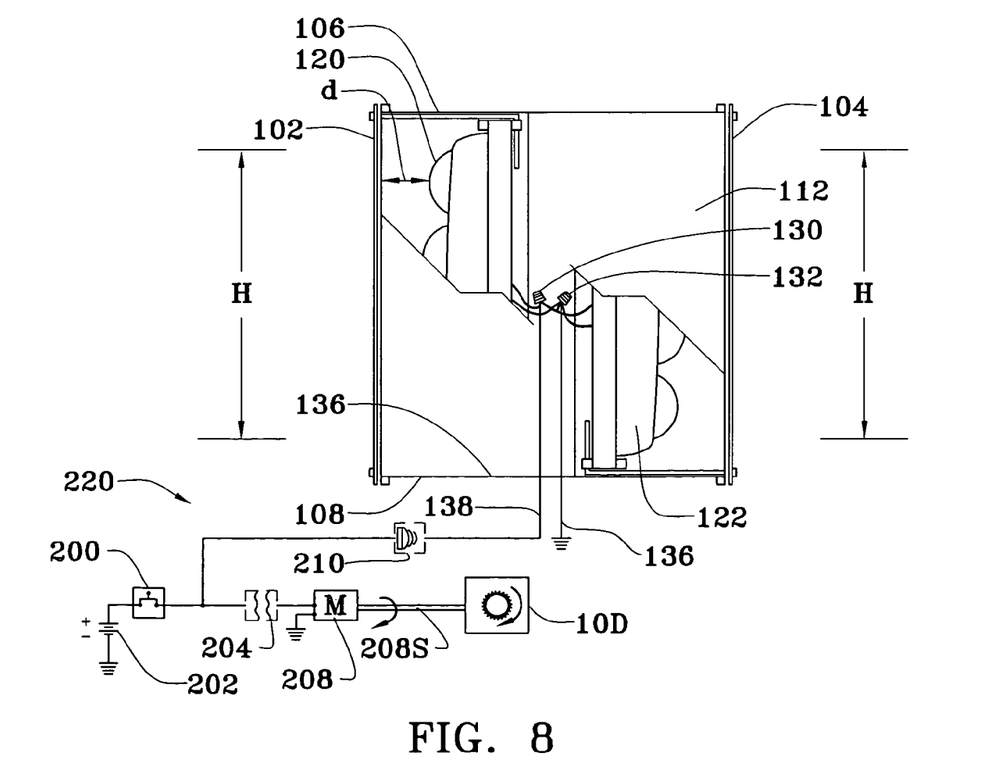
FIG. 8 is an enlarged, partially cut-away, right side, elevational view thereof, and showing the hazard warning light wired into a switch means circuit for the chain saw, wherein a time delay device and an electro-acoustic means are depicted in phantom outline to indicate that they are optional components of the circuit.
Figure 9:
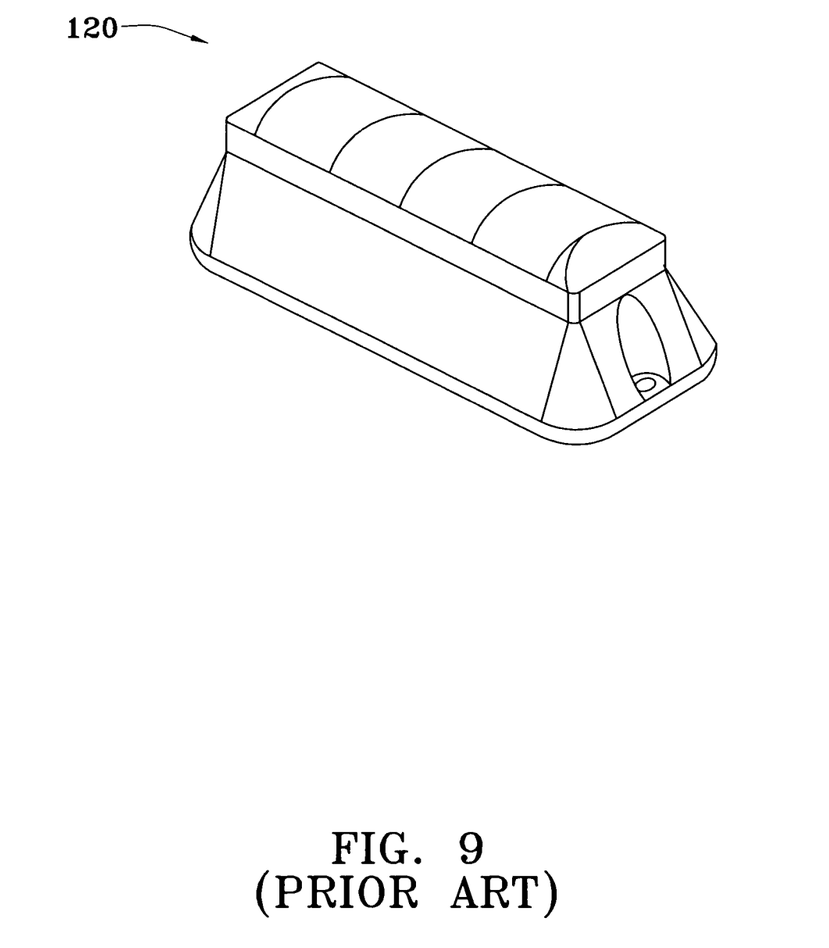
FIG. 9 is a perspective view of an LED bar removed therefrom, comprising four strobe LED lights mounted within a solid, aluminum housing and a sealed, acrylic plastic lens.
Figure 10:
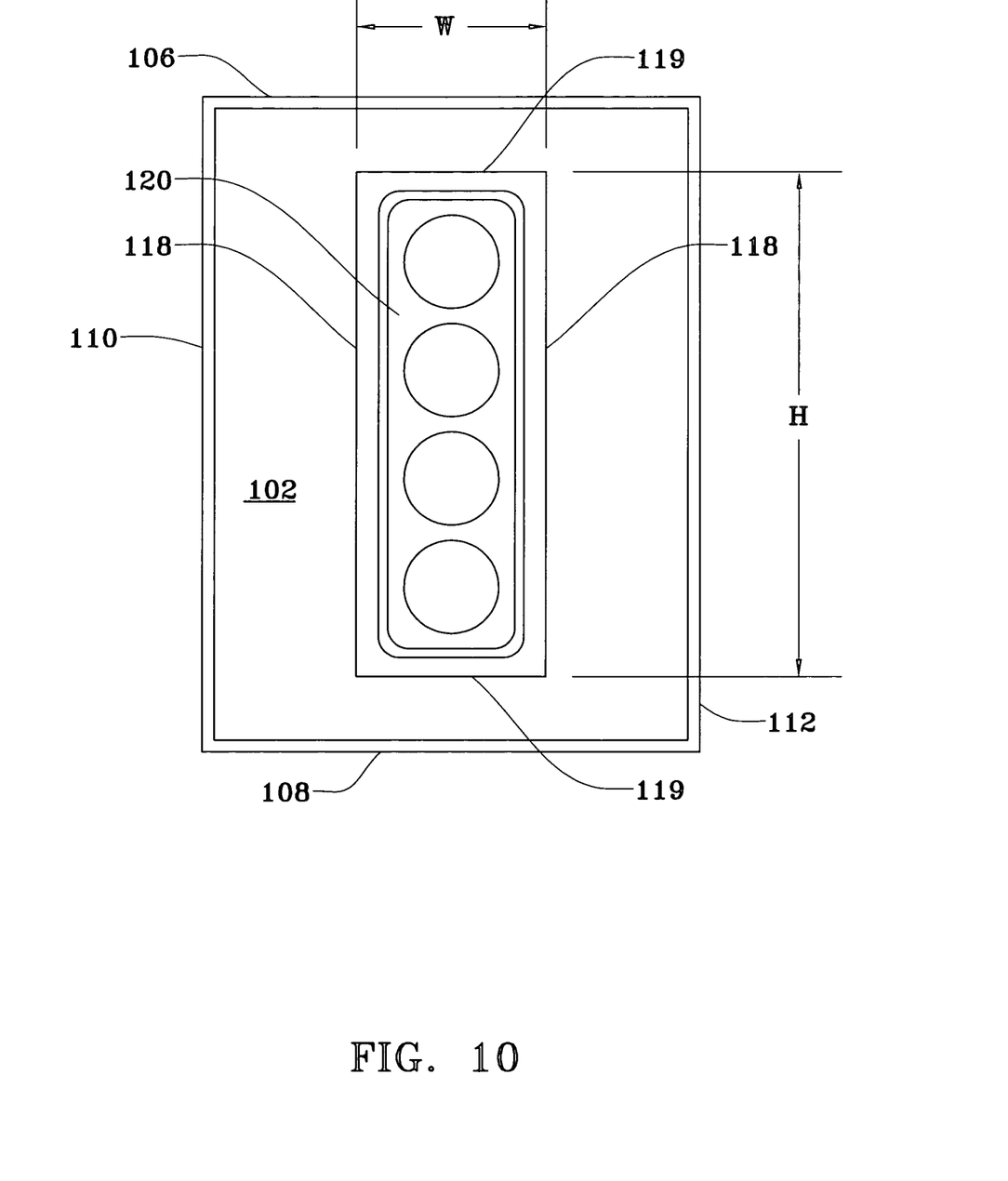
FIG. 10 provides an enlarged, elevational view of an exterior surface of a first end wall of the hazard warning light, its slotted opening and the first light source behind said opening; the second end wall thereof has an identical appearance.

FIGS. 8 and 10 show that the hazard warning light 100 includes a housing 101 that extends from a first end wall 102 to a second end wall 104, which first and second walls 100, 102 are joined at their upper and lower ends by a top wall 106 and bottom wall 108, respectively, thereby defining a substantially closed, interior space. Left and right sides of the first and second end walls 102, 104 are joined by left and right side panels 110, 112, respectively. Each of the end walls 102, 104 has a rectilinear, slotted opening 100S having height H and width W; FIG. 10. It is seen in FIG. 10 that the slotted opening 100S is defined by a first, parallel pair of sides 118 having height H joined by a second parallel pair of sides 119 having width W.

Figure 7:
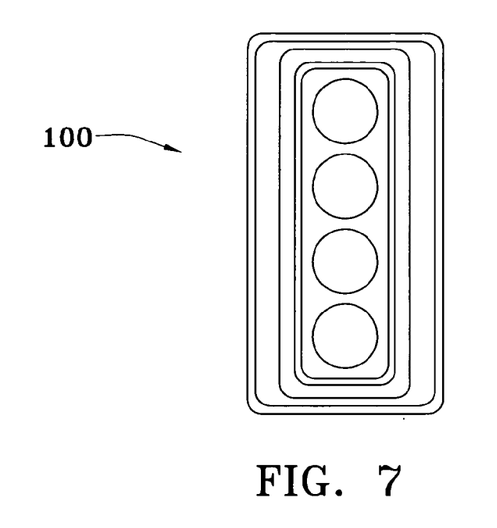
FIG. 7 is a front, elevational view of the hazard warning light of the present invention, removed from the chain saw housing for visual clarity.

Means is provided for emitting a first light beam 30 in a first direction and a second light beam 30' in an opposite direction throughout a chain shot warning zone Z. Said means includes a first light source 120 mounted within the housing 101 adjacent to, and at a distance d from, the slotted opening 100S of the first end wall 102, and a second light source 122 oppositely mounted within the housing 101 adjacent to, and at a distance d from, the slotted opening 100S of the second end wall 104. Preferably, each of the light sources 120, 122 comprises a linear array of four LED lights aligned and in registry with the slotted openings 100S; most preferably, those are a linear array of four strobe LED lights that provide a flashing hazard warning when they are energized, such as the model STRB-4W vehicle strobe light. Said strobe light model has a 9 to 36 volts direct current operating range and is available, for example, on the Internet at www.superbrightleds.com; see FIG. 7. The distance d and the width W are chosen to make θ some desired angle according to the formula: arctangent $(W/2d)=\theta$, where θ is measured in radians. For example, to achieve θ=15 degrees, which corresponds to Π/12 radians, arctangent (W/2d) is set equal to Π/12 or 0.26 (although some adjustment to this calculation may have to be made to allow for the thickness of the first and second walls 102, 104 and/or for the thickness of the rear wall 13 of the chain box 12). The height H is chosen to permit maximal illumination of the zone Z in the vertical dimension so as to be likely catch the eye of the chain saw operator and persons nearby whenever they are positioned within the chain shot warning zone Z and the chain saw 10 is in operating mode; thus, H will always at least be greater than W. In practice, W made equal to 0.45 inch (about 1.1 centimeter) and with d adjusted accordingly has provided the desired result.

Means is provided for energizing the first and second light beams if, and only if, the cutting chain 10C is rotating about the chain guide bar 10B, as follows. Positive electrical leads of the first and second light sources 120, 122 are joined by a first twist-on wire connector 130 and negative electrical leads of said light sources are joined by a second twist-on wire connector 132. A pair of wire taps 136, 138 have their first ends connected to the first and second twist-on wire connectors 130, 132 and their opposite, second ends are wired into a switch means circuit 220 that includes an electrical power source (e.g., electric battery 202 having a negative terminal wired to ground) and controls the starting and stopping of the chain drive 10D of the chain saw 10. In the case of a chain saw 10 that is attached to, suspended from, or incorporated into a dangle head processor 16 attached to an articulated boom 18 that is carried by a forest harvester carrier 20, such switch means 200 is controlled by the operator in the cab 22 and, when the switch means is in a closed condition completes an electrical switch means circuit 220 that activates a hydraulic system to cause rotation of the drive shaft 208S of a hydraulic motor 208 in driving engagement with the chain drive 10D; see FIG. 8. Accordingly, if, and only if, the switch means circuit 220 is in a closed condition, and the cutting chain 10C is thereby caused to rotate about the chain guide bar 10B will electric current pass through the wire taps 136, 138 and thereby cause the light sources 120, 122 to illuminate the chain shot warning zone Z. In the case of an electrically-powered, hand-held chain saw 10 having electric switch means for triggering on and off an electric motor in driving engagement with a chain drive 10D, the housing 101 is attached to the chain saw in or near the plane B-B of the chain guide bar 10B (e.g. attached to a forehandle portion of the chain saw), and the taps 136, 138 are likewise wired into the electric switch means circuit 220 thereof and with like result.

A still better warning can be provided by the chain saw hazard warning light 100, both to persons within the chain saw hazard warning zone Z and to persons who are nearby and approaching it, if there is a time delay between the onset of emission of the first and second light beams 30, 30' and the commencement of motion of the cutting chain 10C around the chain guide bar 10B. The time delay provides to persons within or approaching the chain saw hazard warning zone Z some time to leave the zone or change course to avoid the zone. This can be accomplished by interposing an electrical, time delay device 204 between the switch means 200 and the chain drive 10D but not between the switch means and the chain saw hazard warning light 100; see FIG. 8. By this arrangement, a chain saw operator's closing the switch means 200 first energizes the hazard warning light 100 and only later, after a time delay, commences operation of the chain saw 10. For this purpose, a suitable time delay could be, for instance, one to six seconds. Also optional is an electroacoustical means 210 wired into the switch means circuit 220, either in series with hazard warning light 100 as depicted in FIG. 8, or in parallel with the chain saw hazard warning light. The electro-acoustical means 210 can include a loudspeaker and/or an electric buzzer to emit sound into the chain shot hazard warning zone Z to accompany the light being emitted by the hazard warning light 100, especially in the event that visitors are in or near the zone who are not normally in the area and are unfamiliar with the meaning of light emitted from the chain saw hazard warning light 100.

Although the above description and accompanying drawings relate to a specific, preferred embodiment of the present invention as presently contemplated by the inventor, it will be understood that various changes, modifications and adaptations may be made without departing from the spirit of the invention. It is intended that the invention not be limited to the particular terms used in the following claims and/or to the particular embodiments disclosed as the best mode contemplated for carrying out this invention, but that the invention will include any and all embodiments and equivalents falling within the scope of the appended claims.

I claim:

1. A warning light system for use with a chain saw having a cutting chain mounted for rotation about a chain guide bar, and providing a chain saw hazard warning light for generating a warning light throughout a chain shot warning zone whenever said cutting chain is in rotational motion about said chain guide bar, said system comprising:
    a first electric light source for emitting a first light beam in a first direction throughout, and limited to, said warning zone;
    a second electric light source for emitting a second light beam in a second, opposite direction throughout, and limited to, said warning zone;
    wherein the first and second electric light sources are energized to emit the first light beam and the second light beam if, and only if, said cutting chain is in rotational motion about said chain guide bar;
    wherein said warning zone is defined by first and second pairs of planes that diverge in opposite directions from said chain guide bar, said planes being disposed at equal, acute angles to, and on opposite sides of, a plane that includes said chain guide bar, and
    wherein said chain shot warning zone is configured as a danger zone where flying fragments of a broken cutting chain would go along said first and second directions if a chain shot situation were to occur.

2. The warning light system of claim 1, wherein said first and second electric light source for emitting said first and second light beams includes a housing that extends from a first end wall to a second, opposite, end wall, said first and second end walls each having a slotted opening to permit passage of said first and second light beams therethrough, respectively;
    said first electric light source means mounted within said housing adjacent to said first slotted opening and facing said first direction; and
    said second electric light source means mounted within said housing adjacent to said second slotted opening and facing said second direction.

3. The warning light system of claim 2, wherein
    each said slotted opening is rectilinear and is defined by a first, parallel pair of sides having height H joined by a second parallel pair of sides having width W;
    said first pair of sides is parallel to said plane that includes said chain guide bar; and
    H is greater than W.

4. The warning light system of claim 3, wherein a distance d from said first and second electric light source to said first and second slotted openings, respectively, and the width W are chosen such that said acute angles are each in the range 10 to 15 degrees.

5. The warning light system of claim 4, wherein said first and second electric light sources each include at least one light emitting diode.

6. The warning light system of claim 5, wherein said first and second light sources each include at least one light emitting diode strobe light.

7. The warning light system of claim 6, wherein said first and second light sources each include four light emitting diode strobe lights aligned parallel to first sides of said first and second slotted openings, respectively.

8. The warning light system of claim 4, wherein
    said chain saw is a harvester-mounted chain saw mounted within a hollow, interior portion of a chain box for pivotal movement of said chain guide bar between a retracted position within said chain box and an extended, cutting position outside of said chain box, said chain box having a pair of side walls joined by a rear wall and said chain box having an open front to permit rotation of said chain saw to said cutting position;
    said housing is attached to said interior portion of said chain box such that said first end of said housing faces toward said first direction and said second end faces toward said rear wall of said chain box; and
    said rear wall has a rectilinear, slotted opening in registry with said second slotted opening of said second end of said housing and dimensioned to permit passage of said second light beam therethrough.

9. The warning light system of claim 8, wherein said first and second light sources each include four light emitting diode strobe lights aligned parallel to first sides of said first and second slotted openings, respectively.

10. The warning light system of claim 9, wherein
said chain saw includes a hydraulic motor for rotating said cutting chain around said chain guide bar;
wherein said chain saw is mounted to a forest harvester carrier, said carrier including:
an electric battery; and
chain saw switch means wired to said battery for activating and deactivating said hydraulic motor; and
wherein said chain saw switch means for energizing said first and second electric light sources for emitting said first and second light beams if, and only if, said cutting chain is in rotational motion about said chain guide bar includes a wire tap that connects said chain saw switch means to said first and second light sources.

11. The warning light system of claim 10, further including electro-acoustic warning means wired to said first and second electric light sources for providing a sound alert to accompany said first and second electric light sources, wherein said first and second electric light sources for emitting said first and second light beam if, and only if, said cutting chain is rotating about said chain guide bar.

12. A method for use with a chain saw having a cutting chain mounted for rotation about a chain guide bar and with a switch means circuit operably connected to said chain saw for starting and stopping said rotation by energizing and deenergizing a chain drive thereof, respectively, and generating a warning light throughout a chain shot hazard warning zone if and only if, said rotation is, or will be within T seconds, occurring, comprising the steps of:
attaching to said chain saw or to a device to which said chain saw is attached, incorporated into, or suspended from, a chain saw hazard warning light,
wherein said chain saw hazard warning light includes
a housing that extends from a first end wall to an opposite second end wall, said first and second end walls each having first and second, rectilinear, slotted openings, respectively, said openings each having height H and width W;
a first electrical light source mounted within said housing a distance d from said rectilinear, slotted opening of said first end wall and disposed for projecting a first light beam through said first slotted opening in a first direction throughout, and limited to, said warning zone, said first electric light source having a first pair of electrical wire leads;
a second electrical light source mounted within said housing a distance d from said rectilinear, slotted opening of said second end wall, and disposed for projecting a second light beam through said second slotted opening in a second, opposite direction throughout, and limited to, said warning zone, said second electric light source having a second pair of electrical wire leads;
a first wire tap attached to a first wire lead of each said pairs of wire leads; and a second wire tap attached to said second wire leads of each of said second pairs of wire leads;
wiring said first and second wire taps into said switch means circuit such that electrical current will flow through said first and second electrical light sources to cause them to emit light whenever said switch means circuit is in a closed condition; and
wherein said warning zone is defined by first and second pairs of planes that diverge in opposite directions from said chain guide bar, said planes being disposed at equal, acute angles to, and on opposite sides of, a plane that includes said chain guide bar, said acute angles are in the range 10 to 20 degrees, and T is greater than or equal to zero; and
wherein said chain shot warning zone is configured as a danger zone where flying fragments of a broken cutting chain would go along said first and second directions if a chain shot situation were to occur.

13. The method of claim 12, wherein W and d are chosen such that arctangent (W/2d) is in the range $\Pi/18$ to $\Pi/9$ radians, corresponding to 10 to 20 degrees.

14. The method of claim 12, further comprising the step of creating a rectilinear, slotted opening in any portion of said chain saw or in said device that interferes with the projection of light from said first and/or second light sources into said warning zone in order to permit light to project from said sources throughout said warning zone whenever said rotation is occurring or will be occurring within T seconds.

15. The method of claim 14, wherein said chain saw is a harvester-mounted chain saw and said device is a chain box comprising a left wall, a right wall and a rear wall that joins said left and right walls thereby defining a hollow interior space within said chain box that is open at the front thereof, said housing of said chain saw hazard warning light is mounted to one of said left and right walls, and said slotted opening is created in said rear wall adjacent to, and in registry with, said rectilinear, slotted opening of said second end wall of said housing.

16. The method of claim 15, further comprising the step of interposing time delay means between said switch means circuit and said chain drive, said time delay means delaying by T seconds the energizing of the chain drive of said chain saw after each closing of said switch means circuit, wherein T is greater than zero.

17. The method of claim 16, wherein said first and second electric light sources are each a light bar comprising at least one LED light.

18. The method of claim 17, wherein said first and second electric light sources are each a light bar comprising a linear array of four strobe LEDs aligned and in registry with said first and second slotted openings, respectively.

19. The method of claim 18, wherein T is in the range of one to six seconds.

20. The method of claim 12, further including wiring electro-acoustical warning means into said switch means circuit such that said electro-acoustical means will emit a warning sound into said warning zone if, and only if, said chain saw hazard warning light is emitting light.

* * * * *